United States Patent
Kato

(10) Patent No.: US 9,510,231 B2
(45) Date of Patent: Nov. 29, 2016

(54) CONGESTION CONTROL APPARATUS AND CONGESTION CONTROL METHOD

(75) Inventor: Hidenori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/233,372

(22) PCT Filed: Jun. 8, 2012

(86) PCT No.: PCT/JP2012/003749
§ 371 (c)(1),
(2), (4) Date: Jan. 16, 2014

(87) PCT Pub. No.: WO2013/021532
PCT Pub. Date: Feb. 14, 2013

(65) Prior Publication Data
US 2014/0162647 A1 Jun. 12, 2014

(30) Foreign Application Priority Data
Aug. 8, 2011 (JP) .................................. 2011-172895

(51) Int. Cl.
*H04W 28/02* (2009.01)
*H04L 12/891* (2013.01)
(Continued)

(52) U.S. Cl.
CPC .......... *H04W 28/0289* (2013.01); *H04L 47/41* (2013.01); *H04Q 3/0091* (2013.01); *H04M2242/04* (2013.01); *H04Q 2213/13098* (2013.01); *H04Q 2213/13164* (2013.01); *H04Q 2213/13166* (2013.01); *H04W 8/186* (2013.01); *H04W 28/02* (2013.01)

(58) Field of Classification Search
CPC ...... H04W 28/0289; H04Q 7/24; H04Q 7/20
See application file for complete search history.

(56) References Cited

U.S. PATENT DOCUMENTS 7,228,134 B2 6/2007 Gandhi et al.
8,315,596 B2 11/2012 Obata et al.
(Continued)

FOREIGN PATENT DOCUMENTS

CN 101471884 A 7/2009
EP 2 205 026 A1 7/2010
(Continued)

OTHER PUBLICATIONS

International Search Report in PCT/JP2012/003749 dated Jul. 10, 2012 (English Translation Thereof).
(Continued)

*Primary Examiner* — Myron K Wyche
(74) *Attorney, Agent, or Firm* — McGinn IP Law Group, PLLC

(57) ABSTRACT

In order to properly and equally impose a communication restriction in the case where congestion may occur due to a disaster or the like, a congestion control apparatus (100) includes: collecting means (110) for collecting mobile station information on a plurality of mobile stations camping on a radio base station to be a target of a communication restriction; grouping means (120) for dividing, based on the mobile station information, the plurality of mobile stations into a plurality of groups each serving as a unit of the communication restriction, by using a grouping method according to which an imbalance among the groups becomes equal to or less than a predetermined reference; and transmission means (130) for transmitting information specifying the grouping method. Moreover, the transmission means (130) transmits, to the mobile station, communication restriction information indicative of restriction contents such that the grouping method can be specified. The restriction contents are displayed on a screen of the mobile station, and a transmission restriction, a talk time restriction or the like is imposed in accordance therewith.

15 Claims, 12 Drawing Sheets

(51) Int. Cl.
*H04Q 3/00* (2006.01)
*H04W 8/18* (2009.01)

(56) References Cited

U.S. PATENT DOCUMENTS

| 2006/0166699 A1 | 7/2006 | Aghvami et al. |
| 2008/0032717 A1* | 2/2008 | Sawada ................. H04L 12/585 455/466 |
| 2008/0102853 A1* | 5/2008 | Kagimoto ............. H04W 28/02 455/453 |

FOREIGN PATENT DOCUMENTS

| JP | 08-317471 A | 11/1996 |
| JP | H10-308978 A | 11/1998 |
| JP | 2003-249959 A | 9/2003 |
| JP | 2005-012806 A | 1/2005 |
| JP | 2009-284327 A | 12/2009 |
| JP | 2010-045525 A | 2/2010 |
| JP | 2010-232811 A | 10/2010 |
| JP | 2011-044930 A | 3/2011 |
| WO | WO 02/17671 A1 | 2/2002 |
| WO | WO2010/116648 A1 | 10/2010 |

OTHER PUBLICATIONS

Extended European Search Report dated Dec. 3, 2014.
Japanese Office Action dated Jul. 7, 2015 with an English translation thereof.
Japanese Office Action dated Aug. 9, 2016 with an English translation thereof.
Chinese Office Action dated Aug. 26, 2016 with an English translation thereof.

* cited by examiner

| GROUP NUMBER | TERMINAL LAST DIGIT | TRANSMITTABLE PERIOD (WITH TALK TIME RESTRICTION) | TALK TIME UPPER LIMIT (PERMITTED TALK TIME) |
|---|---|---|---|
| No 0 | 0 | 9:00~9:30, 11:15~11:45 | 3 MINUTES |
| No 1 | 1 | 9:15~9:45, 11:30~12:00 | 3 MINUTES |
| ... | ... | ... | ... |
| No 9 | 9 | 11:00~11:30, 13:15~13:45 | 3 MINUTES |

Fig. 7

CONGESTION CONTROL APPARATUS AND CONGESTION CONTROL METHOD

TECHNICAL FIELD

The present invention relates to a congestion control apparatus, a congestion control method, and a congestion control system. In particular, the present invention relates to a congestion control apparatus, a congestion control method, and a congestion control system with which congestion control is exerted while maintaining equality among mobile stations on which a communication restriction is imposed.

BACKGROUND ART

In general, with a mobile communication system, a cell size determination or a cell arrangement is properly performed taking into consideration of the expected number of mobile stations located in the coverage of each cell or the expected communication data quantity. In this manner, the operator structures the system in order to provide the communication service of certain quality and, therefore, the users of the mobile terminals can receive the communication service without being bothered by any limitation placed on time and place.

However, in some cases, e.g., when many people gather at a specific location of any event, or when a natural disaster occurs, an enormous amount of access requests may be made to a specific base station or a specific switching center, whereby congestion may occur.

As a method for preventing a reduction in the performance of the system function upon the occurrence of congestion, Patent Literature 1 discloses a congestion control method. According to this method, mobile terminals located in the service area of a base station are managed as a group. When congestion occurs, restriction information data is transmitted to the mobile terminals belonging to a group being the target of a restriction. Then, each mobile terminal receiving the restriction information data extracts the restriction start time and the restriction removal time of the group to which the mobile terminal itself belongs, and displays the data on a display unit such as liquid. Accordingly, each user can tell that the talk and communication functions of his/her mobile terminal are in the operation-stopped state, and when the functions become available. Further, execution of a communication restriction can prevent the congestion state from being continued.

Further, Patent Literature 2 discloses a method for restricting access requests from mobile stations when lines cannot be secured due to an enormous amount of access requests triggered by disaster situations or the like. According to the access restriction method, each base station transmits transmission restriction information via a broadcast channel. When mobile stations receive the transmission restriction information sent via the broadcast channel, they each determine whether or not the access restriction is imposed on the self station. When the access restriction is imposed on the self station, transmission of the self station is prohibited, except for the case where a call is received or in the case of emergency communication. What is further included is an output function for broadcasting the users about the restriction and the removal thereof. Accordingly, even in disaster situations, it becomes possible to prevent access requests from temporarily occupying the wireless lines.

CITATION LIST

Patent Literatures

Patent Literature 1: Japanese Unexamined Patent Application Publication No. 2010-232811
Patent Literature 2: Japanese Unexamined Patent Application Publication No. H08-317471

SUMMARY OF INVENTION

Technical Problem

In the above-described Patent Literatures 1 and 2, by preliminarily dividing the mobile terminals (mobile stations) into a plurality of groups and notifying the mobile stations about the group number to be subjected to a communication restriction, the communication of the mobile stations belonging to the group specified by the number is restricted. Thus, congestion is avoided.

Here, the mobile stations are divided into groups according to a predetermined reference. However, depending on the situation of the mobile stations located in the service area of a base station, an imbalance toward a particular group may be created.

For example, in the case where a hundred mobile stations camp on a base station, when these mobile stations are divided into five groups of A to E by the aforementioned fixed grouping method, the mobile stations may not be equally divided into the groups, i.e., twenty mobile stations per group. Instead, thirty mobile stations may belong to group A and ten mobile stations may belong to group E. In this case, since there is a great imbalance among the groups, a proper restriction cannot be imposed even when the restriction is imposed on a group-by-group basis. Thus, the congestion disadvantageously remains, or a restriction cannot be equally imposed.

The present invention has been made taking into consideration of the foregoing problems, and an object thereof is to provide a congestion control apparatus and a congestion control method that make it possible to properly and equally impose a communication restriction in the case where congestion may occur, such as in disaster situations.

Solution to Problem

A congestion control apparatus according to a first exemplary aspect of the present invention includes: collecting means for collecting mobile station information on a plurality of mobile stations camping on a radio base station to be a target of a communication restriction; grouping means for dividing, based on the mobile station information, the plurality of mobile stations into a plurality of groups each serving as a unit of the communication restriction, by using a grouping method according to which an imbalance among the groups becomes equal to or less than a predetermined reference; and transmission means for transmitting information specifying the grouping method.

Further, a congestion control method according to a second exemplary aspect of the present invention includes: collecting mobile station information on a plurality of mobile stations camping a radio base station to be a target of a communication restriction; dividing, based on the mobile station information, the plurality of mobile stations into a plurality of groups, by using a grouping method according to which an imbalance among the groups becomes equal to or less than a predetermined reference; and transmitting information specifying the grouping method.

Advantageous Effects of Invention

According to the present invention, a communication restriction can be imposed in a proper and equal manner in the case where congestion may occur, such as in disaster situations.

BRIEF DESCRIPTION OF DRAWINGS

FIG. 7 is a diagram showing one example of a restriction plan list (communication restriction information) according to the second exemplary embodiment;

DESCRIPTION OF EMBODIMENTS (First Exemplary Embodiment)

A mobile communication system according to a first exemplary embodiment is characterized in that a congestion control apparatus is disposed in order to avoid an occurrence of congestion. The congestion control apparatus may be installed in each radio base station or in the switching center. Further, the congestion control apparatus may be disposed on the network side as an independent apparatus. In the following, with reference to the drawings, a description will be given of exemplary embodiments of the present invention.

Figures 1, 2:
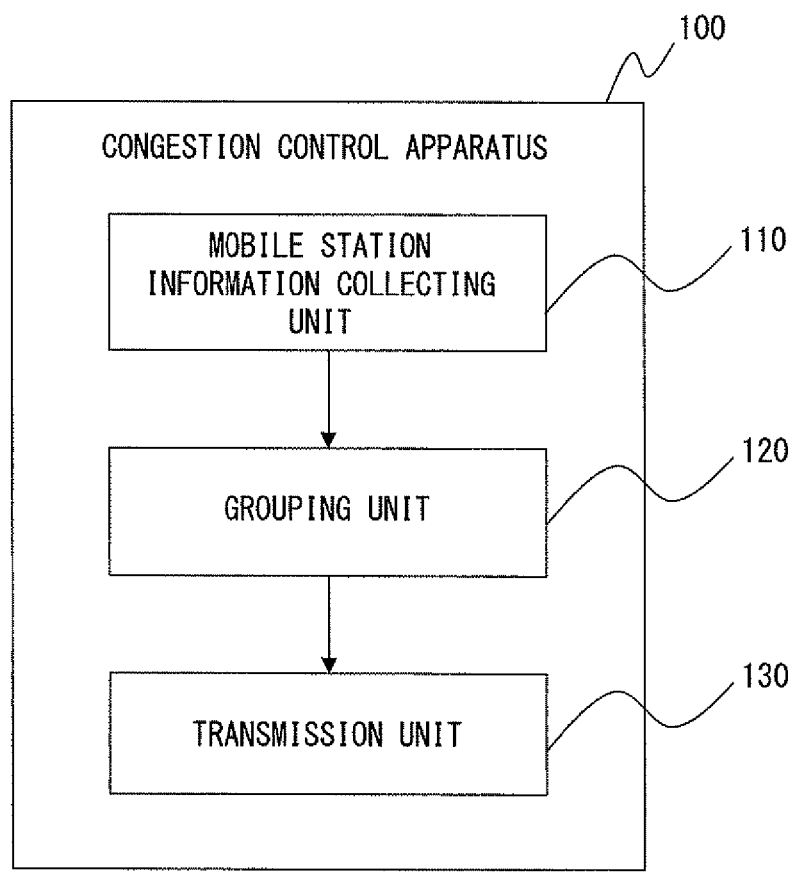
FIG. 1 is a block diagram showing a configuration of a congestion control apparatus according to a first exemplary embodiment.
FIG. 2 is a diagram showing one example of grouping methods according to the first exemplary embodiment.

FIG. 1 is a block diagram showing the configuration of a congestion control apparatus 100 according to the first exemplary embodiment of the present invention. The congestion control apparatus 100 includes a mobile station information collecting unit 110, a grouping unit 120, and a transmission unit 130.

The mobile station information collecting unit 110 collects mobile station information on a plurality of mobile stations camping on a radio base station to be the target of a communication restriction. Here, though the actual target of the communication restriction such as a transmission restriction is mobile stations, the restriction is imposed all at once on the mobile stations camping on a certain radio base station where congestion is occurring. Accordingly, such a radio base station becomes the target of the communication restriction. Further, when congestion is occurring at a switching center, in some cases, the communication restriction is performed on a switching center-by-switching center basis. In such cases also, since the actual target of the communication restriction is the mobile stations camping on the radio base stations governed by the switching center, such radio base stations governed by the switching center become the target of the communication restriction.

Note that, the mobile station information collecting unit 110 may collect the telephone number of each mobile station as the mobile station information, or may collect an identifier that uniquely identifies each mobile station, such as a terminal serial number or a user ID, as the mobile station information. Specifically, the mobile station information collecting unit 110 accesses a database where such pieces of information are collectively stored, to collect the required mobile station information.

The grouping unit 120 divides the plurality of mobile stations into a plurality of groups each forming the unit for a communication restriction, based on the mobile station information collected by the mobile station information collecting unit 110 and by using a grouping method (a method for grouping mobile stations) with which an imbalance among the groups becomes equal to or less than a predetermined reference.

For example, it is assumed that there are five types of methods A to E as grouping methods for dividing mobile stations into a plurality of groups. Here, it is assumed that the grouping unit 120 has grouped a plurality of mobile stations camping on a radio base station being the target of a communication restriction according to the grouping method A, and that an imbalance is created among the groups. Here, when the imbalance is greater than a predetermined reference, it lacks equality when a communication restriction is imposed on a group-by-group basis, and congestion may not be solved or avoided. In such a case, the grouping unit 120 again performs the grouping using any one of the other grouping methods B to E, and employs the grouping method according to which an imbalance among the group becomes equal to or less than a predetermined reference.

For example, in the case where the number of mobile stations is employed as the determination reference for grouping and grouping is performed such that no imbalance is created among the groups as to the number of their respective mobile stations, the grouping unit 120 may search for a grouping method according to which the deviation in the number of mobile stations becomes equal to or less than a predetermined value (for example, 10%), to employ the searched grouping method.

The transmission unit 130 transmits the information specifying the grouping method used by the grouping unit 120. For example, out of the grouping methods A to E, when grouping is performed by the grouping unit 120 using the grouping method B, the transmission unit 130 may transmit information indicative of "B" as the information specifying the grouping method. Further, the transmission unit 130 may transmit, as the information specifying the grouping method, information specifying the mobile stations belonging to their respective groups. The final transmission destination of the information specifying the grouping method is the mobile stations to be subjected to the communication restriction.

As described above, the congestion control apparatus according to the first exemplary embodiment once collects information on the mobile stations to be subjected to a communication restriction, before imposing the communication restriction. Then, the congestion control apparatus performs grouping while avoiding an imbalance among the groups, and thereafter imposes the communication restriction. Accordingly, it becomes possible to remove any inequality, such as the case where a mobile station is accidentally classified into a group to which a great many mobile stations belongs, and consequently cannot be connected to the network because of transmission congestion, despite the mobile station being in a transmittable period. Thus, the congestion state can be solved or avoided in a proper and equal manner.

Further, the grouping method performed by the grouping unit 120 is not limited to the method described above. The grouping unit 120 may perform grouping of mobile stations by allocating mobile stations to be the target of a communication restriction to each of the groups based on the mobile station information of the mobile station information collecting unit 110, while avoiding any imbalance among the groups. The transmission unit 130 transmits, as the information specifying the grouping method, information specifying the mobile stations belonging to their respective groups. Such a configuration may be employed.

For example, as shown in FIG. 2, when the grouping unit 120 classifies mobile stations to be the target of a communication restriction into four groups, i.e., groups W to Z, based on the mobile station information, such that an imbalance among the groups becomes equal to or less than a predetermined reference, the transmission unit 130 may transmit the information as in the table shown in FIG. 2 as the information specifying the grouping method. That is, in the case of FIG. 2, the grouping unit 120 performs grouping using a grouping method according to which: the mobile stations whose last digit is 1, 3 or 4 are allocated to the group W; the mobile stations whose last digit is 2 or 8 are allocated to the group X; the mobile stations whose last digit is 7 or 9 are allocated to the group Y; and the mobile stations whose last digit is 0, 5 or 6 are allocated to the group Z. Accordingly, the transmission unit 130 can transmit, as the information specifying the grouping method, the information indicative of: the mobile stations whose last digit is 1, 3 or 4 belong to the group W; the mobile stations whose last digit is 2 or 8 belong to the group X; the mobile stations whose last digit is 7 or 9 belong to the group Y; and the mobile stations whose last digit is 0, 5 or 6 belong to the group Z, as in the table shown in FIG. 2.

Note that, though the number of mobile stations has been described as an example of the determination reference for an imbalance in performing the grouping, the present invention is not limited thereto. When a priority or importance is allocated for each mobile station, grouping may be performed using a grouping method according to which no imbalance is created among the groups as to the number of mobile stations whose priority or importance is equal to or more than a predetermined reference. Further, grouping may be performed using a grouping method according to which an imbalance among the groups becomes equal to or less than a predetermined reference as to the sum of priorities or degrees of importance of the mobile stations belonging to their respective groups.

For example, a high priority is preliminarily allocated to the mobile station of a subscriber whose safety is especially concerned in disaster situations, e.g., an elderly person, and grouping is performed taking into consideration of the priority. Thus, a further flexible and practical communication restriction can be imposed. Further, it is also possible to classify the mobile station with a high priority into a special group, and generate the communication restriction information while setting a less strict restriction to the special group as compared to the other groups.

Further, those mobile stations associated with the police, the fire department and any other emergency purposes may be preliminarily classified into a special group on which no restriction is imposed. Then, the grouping may be performed as to the other general mobile stations, before a communication restriction is imposed.

(Second Exemplary Embodiment)

A mobile communication system according to a second exemplary embodiment is characterized in that a congestion control function that controls congestion is installed in each radio base station. In the following, a description will be given with reference to the drawings.

Figure 3:
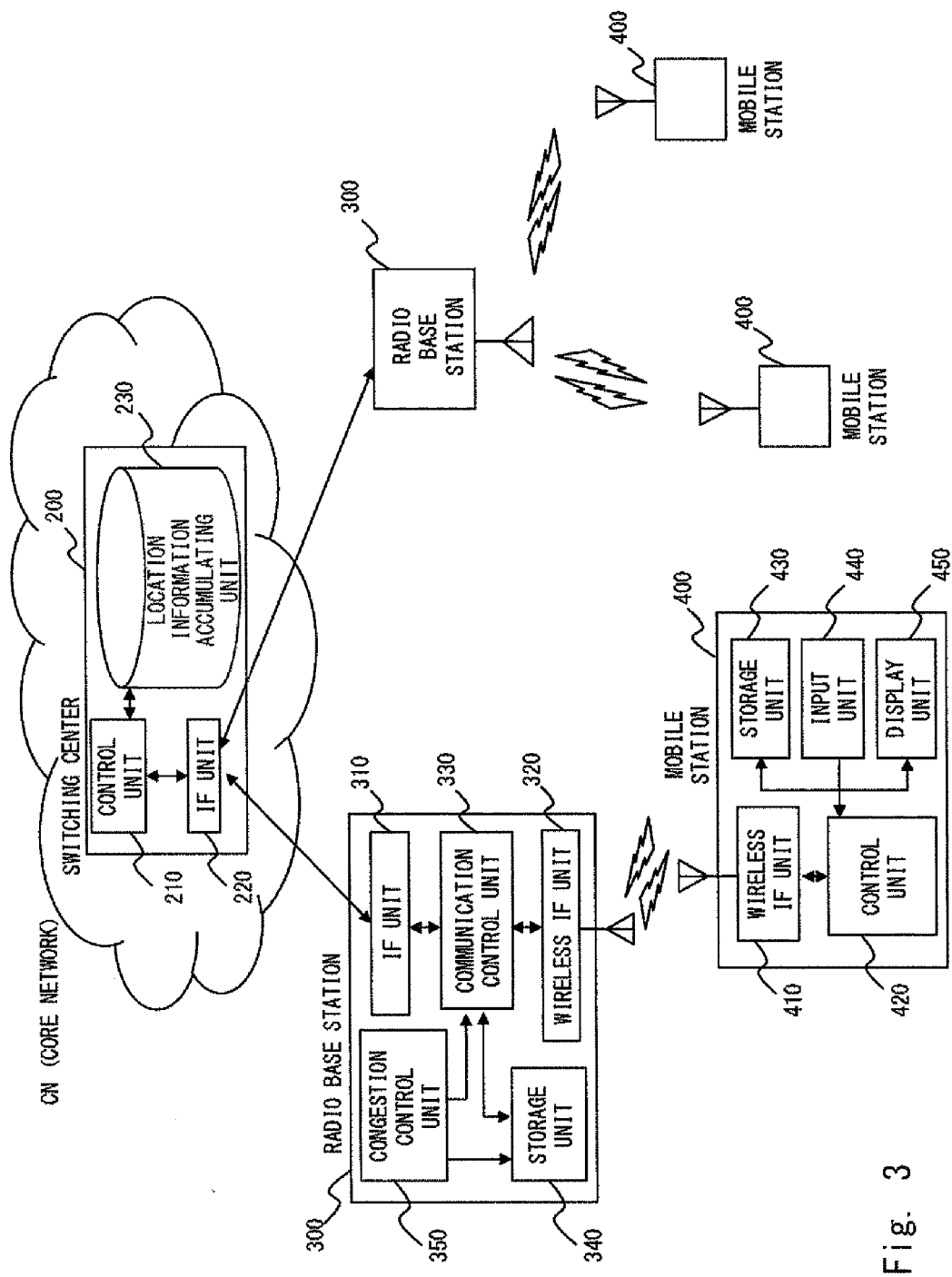
FIG. 3 is a block diagram showing a configuration of the entire mobile communication system according to a second exemplary embodiment.

FIG. 3 is a configuration diagram showing the entire mobile communication system according to the second exemplary embodiment. The mobile communication system is configured to generally include a switching center 200, a plurality of radio base stations 300, and a plurality of mobile stations 400. The plurality of radio base stations 300 are governed by the switching center 200, and the plurality of mobile stations 400 camp on each of the radio base stations 300.

Firstly, a description will be given of the switching center 200. The switching center 200 includes a control unit 210, an IF unit 220, and a location information accumulating unit 230.

The control unit 210 controls the entire switching center. Specifically, the control unit 210 transmits the data, which is received from the radio base stations via the IF unit 220, to the core network side, and transmits the data, which is received from the core network side for mobile stations, to the radio base stations governed by the switching center via the IF unit 220. Further, when the control unit 210 receives a location registering request from any mobile station 400, the control unit 210 performs a general location registering process, and stores the location information of the mobile station in the location information accumulating unit 230. Further, when the control unit 210 receives a request to output mobile station information, which will be described later, from any radio base station 300, the control unit 210 accesses the location information accumulating unit 230 and extracts corresponding mobile station information. Then, the control unit 210 transmits the extracted mobile station information to the radio base station 300.

The IF unit 220 is a communication interface for communicating with radio base stations governed by the switching center.

The location information accumulating unit 230 accumulates location information of the mobile stations 400 in accordance with the location registering control of the control unit 210. In the location information, the mobile stations 400 and the radio base stations 300 are stored as being associated with each other.

Figure 4:
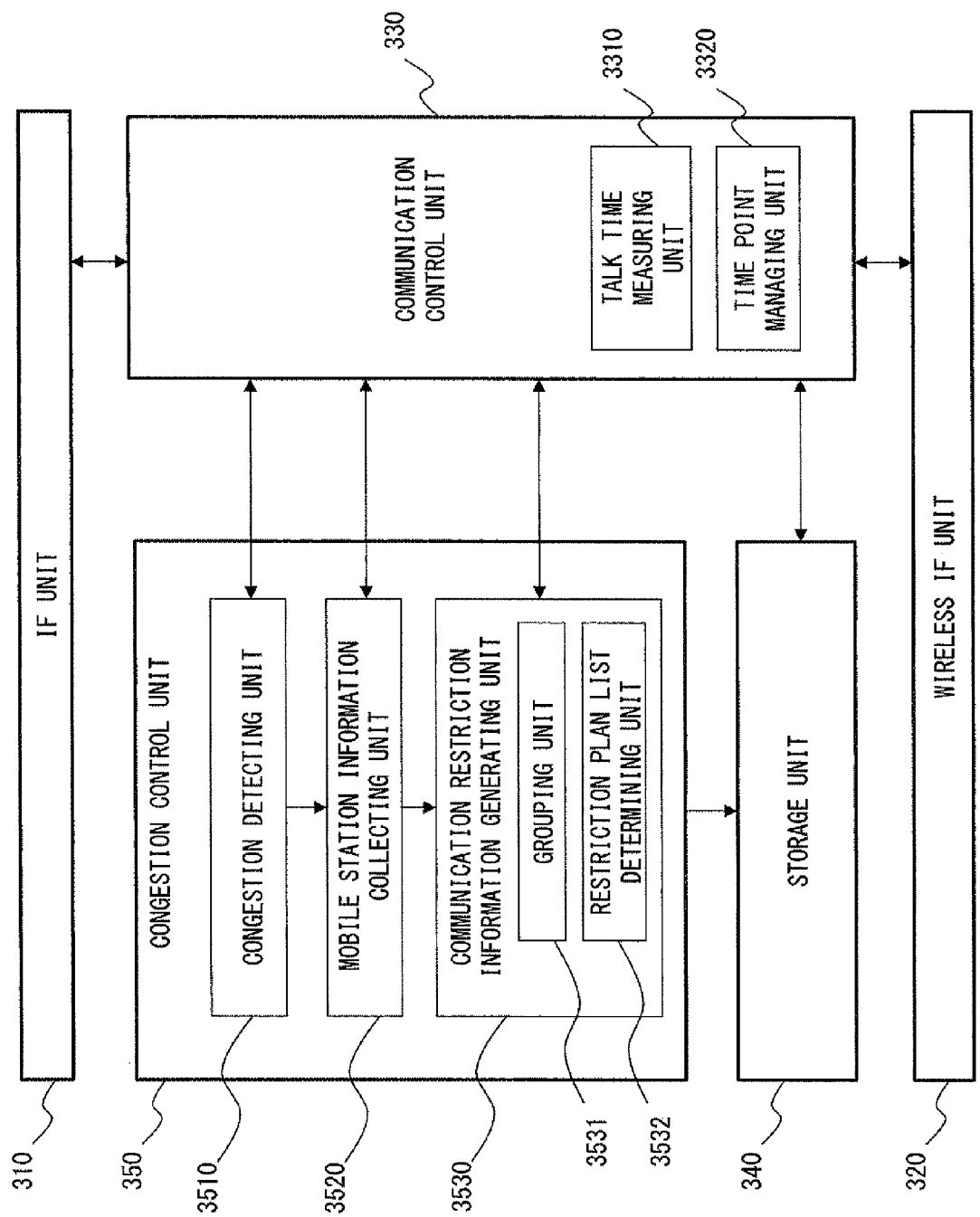
FIG. 4 is a block diagram showing a configuration of a radio base station according to the second exemplary embodiment.

Next, with reference to FIG. 4, a description will be given of the radio base station 300. The radio base station 300 includes an IF unit 310, a wireless IF unit 320, a communication control unit 330, a storage unit 340, and a congestion control unit 350.

The IF unit 310 is a communication interface for communicating with the switching center 200 governing the radio base station.

The wireless IF unit 320 is a wireless communication interface for conducting wireless communication with the mobile stations 400 camping on the base station.

The communication control unit 330 controls communication between the switching center 200 and the mobile stations 400. The communication control exerted by the communication control unit 330 includes scheduling control, i.e., allocation of radio resources to the mobile stations camping on the base station. When the communication control unit 330 receives a communication restriction instruction from the congestion control unit 350, the communication control unit 330 starts a communication restriction; when the communication control unit 330 receives a communication restriction removing instruction, the communication control unit 330 ends the communication restriction.

Further, the communication control unit 330 includes a talk time measuring unit 3310 and a time point managing unit 3320. The talk time measuring unit 3310 measures a talk time as being triggered by a mobile station, whose communication is restricted, starting a talk. Further, the time point managing unit 3320 manages the current time point. The talk time measuring unit 3310 and the time point managing unit 3320 are used in the congestion control mode, which will be described later. When the communication control unit 330 receives an instruction from the congestion control unit 350 to transit to the congestion control mode, the communication control unit 330 exerts communication control to restrict the talk time or talk time period of the mobile stations based on the communication restriction information stored in the storage unit 340.

For example, the communication control unit 330 receives a communication connection request from a mobile station 400 camping on the base station, and allows the mobile station to connect. When a talk is started thereby, the communication control unit 330 measures the talk time of the mobile station camping on the base station using the talk time measuring unit 3310. When the measured talk time reaches the permitted talk time being preliminarily permitted for the mobile station, the communication control unit 330 exerts control to forcibly disconnect the talk of the mobile station to secure the radio resource such that the radio resource can be allocated to other mobile stations. Further, when a mobile station belonging to a group in the talk permitted state is in a talking mode, the communication control unit 330 acquires the current time point from the time point managing unit 3320. When it is past a transmittable period set in the communication control information, the communication control unit 330 exerts control to forcibly disconnect the talk to secure the radio resource such the radio resource can be allocated to the next group.

The storage unit 340 stores the communication restriction information output from the congestion control unit 350. The communication restriction information is referred to by the communication control unit 330 for communication control in the congestion control mode.

The congestion control unit 350 exerts control for solving the congestion state. The congestion control unit 350 specifically includes a congestion detecting unit 3510, a mobile station information collecting unit 3520, and a communication restriction information generating unit 3530.

The congestion detecting unit 3510 detects that congestion is occurring at its own base station. For example, the congestion detecting unit 3510 continuously monitors communication carried out by the communication control unit 330, and determines whether or not the flowing data quantity exceeds a predetermined reference value. As a result of the determination, the congestion detecting unit 3510 detects that congestion is occurring when the data quantity exceeds a predetermined reference value. The congestion detecting unit 3510 notifies the mobile station information collecting unit 3520 about the occurrence of congestion.

Further, when the congestion detecting unit 3510 detects that congestion is solved, it notifies about the congestion being solved. The congestion detecting unit 3510 monitors the traffic of the communication control unit 330, and when it is determined that the congestion is solved, the congestion detecting unit 3510 issues a communication restriction removing instruction to the communication control unit 330.

The mobile station information collecting unit 3520 collects the mobile station information on a plurality of mobile stations camping on a radio base station to be the target of a communication restriction. Here, since congestion is occurring at the self base station, the self base station becomes the radio base station to be the target of a communication restriction and, therefore, the communication restriction is imposed on the mobile stations camping on the self base station. Accordingly, the mobile station information collecting unit 3520 collects mobile station information on the mobile stations camping on the self base station.

Specifically, the mobile station information collecting unit 3520 issues an output request for the mobile station information on the plurality of mobile stations camping on the self base station to the switching center 200 via the communication control unit 330 and the IF unit 310, and receives the mobile station information from the switching center 200. The mobile station information collecting unit 3520 sends the collected mobile station information to the communication restriction information generating unit 3530.

The communication restriction information generating unit 3530 generates communication restriction information for restricting communication of the mobile stations, based on the mobile station information received from the mobile station information collecting unit 3520. The communication restriction information generating unit 3530 is specifically configured by a grouping unit 3531 that performs grouping of mobile stations to be subjected to a communication restriction, and a restriction plan list determining unit 3532.

When the grouping unit 3531 receives the mobile station information, the grouping unit 3531 classifies the plurality of mobile stations into a plurality of groups based on the mobile station information and by using a grouping method according to which an imbalance among the groups becomes equal to or less than a predetermined reference.

Figure 5:
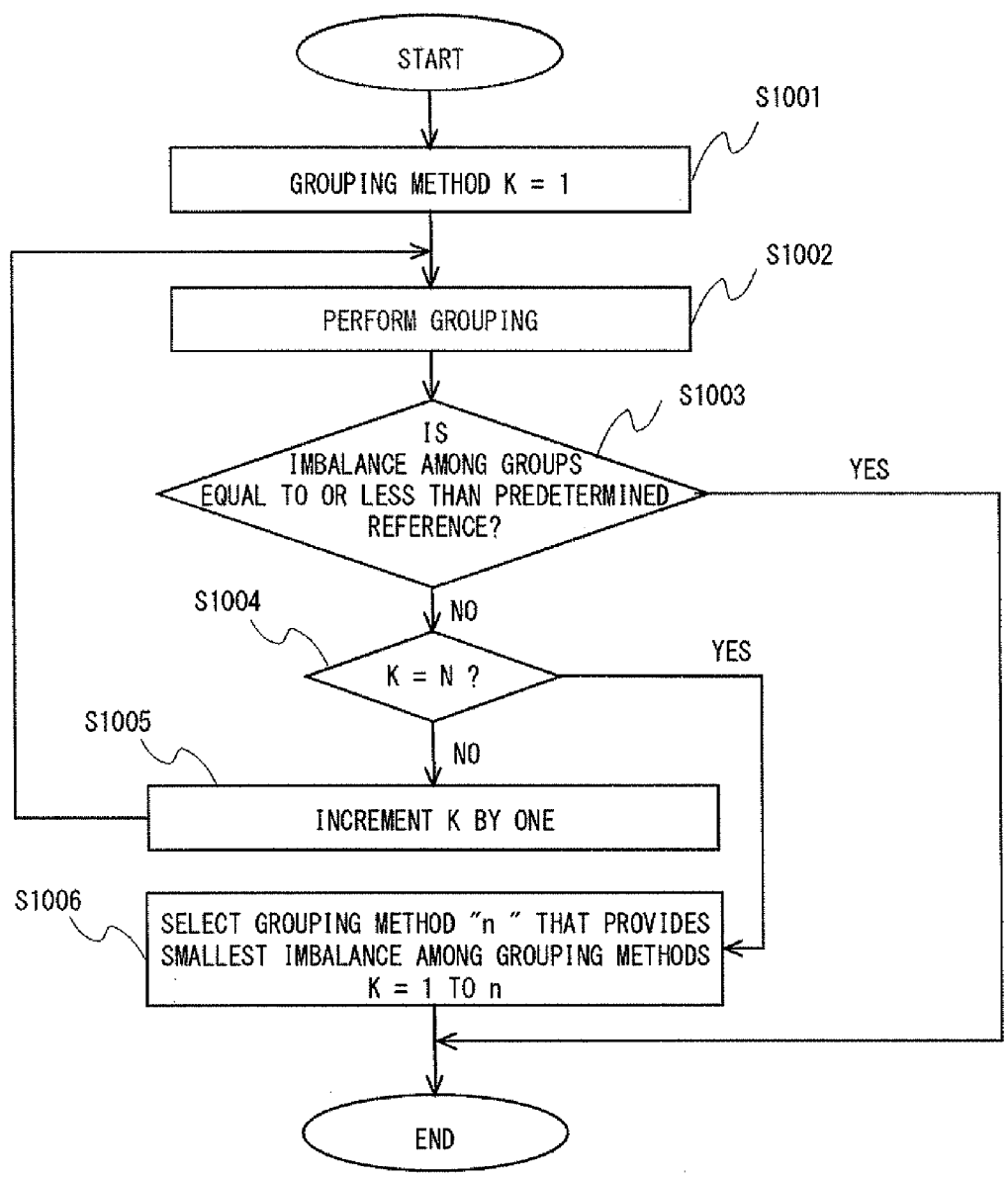
FIG. 5 is a flowchart showing one example of processing operations in a grouping unit according to the second exemplary embodiment.

FIG. 5 is a flowchart showing one example of the flow of a grouping process performed by the grouping unit 3531. As to this process, it is understood that "n" pieces of grouping methods 1 to N are preliminarily registered as the grouping methods.

The grouping unit 3531 sets the grouping method 1, out of the plurality of preliminarily registered grouping methods (S1001). Next, the grouping unit 3531 performs grouping of the mobile stations to be subjected to the communication restriction, based on the mobile station information received from the mobile station information collecting unit 3520 and by using the grouping method set in S1001 (S1002).

Next, the grouping unit 3531 calculates an imbalance among the groups, and determines whether or not the imbalance is equal to or less than a first reference (S1003). Here, when the first reference is satisfied as a result of the determination in S1003, the grouping unit 3531 determines that the communication restriction is to be imposed with the grouping method, and notifies the restriction plan list determining unit 3532 at the following stage about information specifying the grouping method. On the other hand, as a result of the determination in S1003, when the imbalance exceeds the first reference, the control proceeds to next S1004.

The grouping unit 3531 determines whether or not grouping has been performed with all the grouping methods (S1004). Specifically, the grouping unit 3531 determines whether or not the grouping method K performed in S1002 is the grouping method N, being the last one of the registered grouping methods. When K≠N as a result of the determination in S1004, the grouping unit 3531 increments K by one (S1005). Then, the control returns to SS1002, and again grouping is performed according to the next grouping method.

On the other hand, when K=N in S1004, it means that the imbalance among the groups did not satisfy the first reference according to all the grouping methods. Accordingly, the grouping unit 3531 selects the grouping method "n" providing the smallest imbalance out of the grouping methods 1 to N (S1006). That is, employing the provision of the smallest imbalance among the groups among the grouping methods 1 to N as the second reference, the grouping unit 3531 determines to impose a communication restriction with the grouping method providing the smallest imbalance, and notifies the restriction plan list determining unit 3532 at the following stage about information specifying the grouping method.

Note that the algorithm described above is merely an example, and the grouping unit 3531 may perform grouping according to any other algorithm. For example, according to the algorithm described above, once a predetermined reference is satisfied, the grouping method used at that time is determined as the grouping method with which a communication restriction is imposed. However, the present invention is not limited thereto. For example, as shown in FIG. 6, it is also possible to determine, after grouping is performed according to all the registered grouping methods, the grouping method providing the smallest imbalance as the grouping method with which a communication restriction is imposed.

Figure 6:
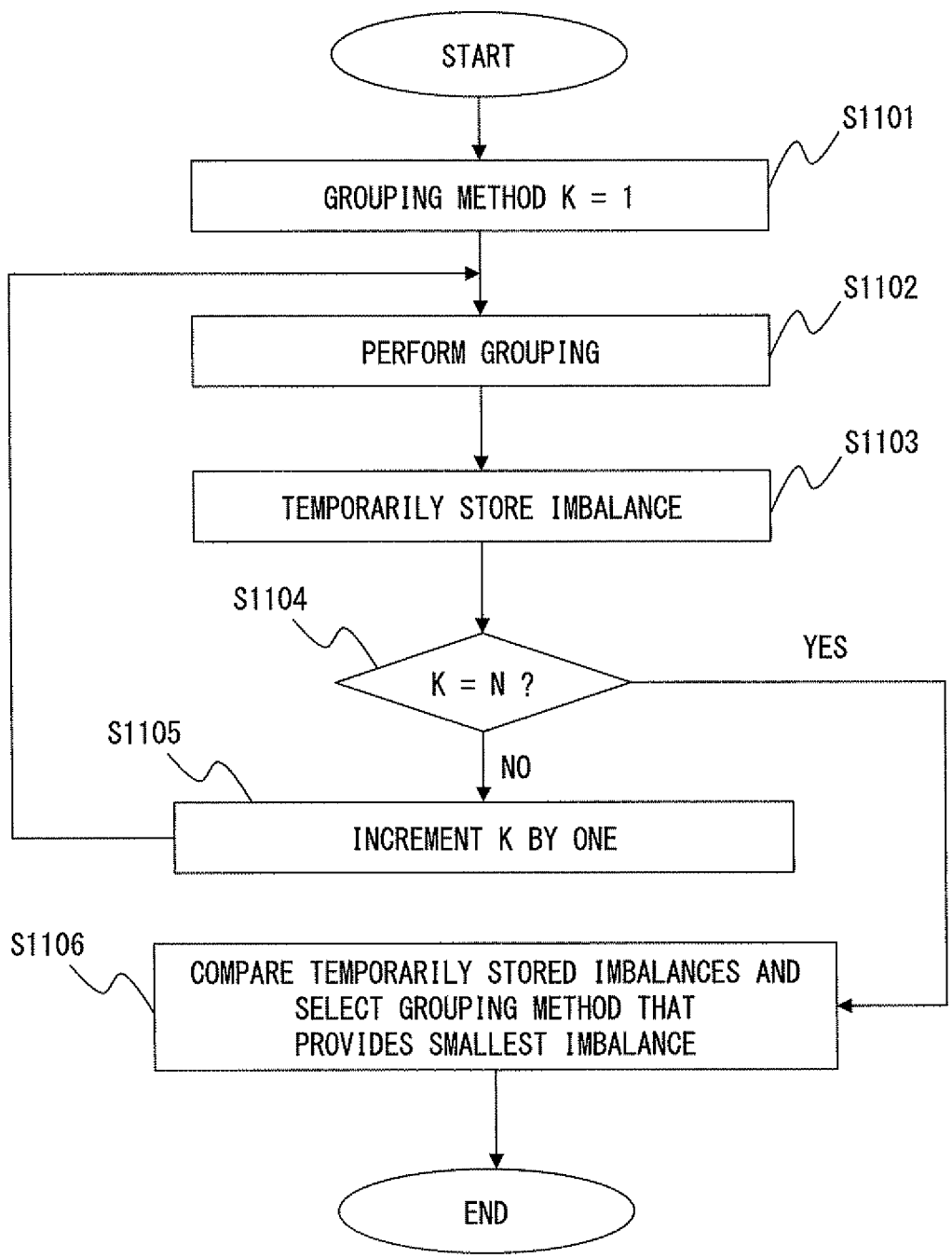
FIG. 6 is a flowchart showing another example of processing operations in the grouping unit according to the second exemplary embodiment.

In the algorithm shown in FIG. 6, since S1101 and S1102 are respectively identical to S1001 and S1002 in FIG. 5, the description thereof is omitted. The grouping unit 3531 obtains an imbalance among the groups created according to the grouping method K in S1102, and temporarily stores the imbalance (S1103).

Next, the grouping unit 3531 determines whether or not K=N (S1104). Here, N is the last grouping method. When K≠N as a result of the determination in S1104, K is incremented by one and the control returns to S1002 (S1105). On the other hand, when K=N, it means that all the preliminarily registered grouping methods have been tried and an imbalance is calculated for each method and, therefore, control proceeds to the next S1106. In S1106, the grouping unit 3531 compares the grouping methods against one another as to the imbalance among the groups temporarily stored in S1103. Then, the grouping unit 3531 selects and employs the grouping method providing the smallest imbalance (S1106).

The grouping unit 3531 may determine the grouping method using such an algorithm. In the case where such an algorithm is used also, the grouping unit 3531 divides a plurality of mobile stations into a plurality of groups based on which a communication restriction is imposed, such that an imbalance among the groups becomes the smallest, i.e., such that an imbalance among the groups becomes equal to or less than a predetermined reference, among a plurality of preliminarily registered grouping methods.

The restriction plan list determining unit 3532 receives, from the grouping unit 3531, the information specifying the grouping method having used for grouping, and determines the contents of the restriction plan list.

Here, the restriction plan list refers to the communication restriction information in which the communication restriction contents are listed. FIG. 7 shows one example of the restriction plan list. In the restriction plan list shown in FIG. 7, under each of group numbers indicative of the groups created by the grouping unit 3531, information for specifying mobile stations belonging to such groups is noted. Thus, the information specifying the grouping method is contained. The restriction plan list further contains a transmittable period and a talk time upper limit for each group as being associated with the group number. Note that, the contents of the restriction plan list are not limited thereto. It is also possible that only a transmission restriction is imposed and a notice as to the period of the transmission restriction is issued, or only a talk time restriction is imposed and a notice as to the permitted talk time is issued. Further, it is also possible that only mail transmission is permitted. Alternatively, the data quantity of each mail massage or the frequency of mail transmission may be limited.

The restriction plan list determining unit 3532 generates the restriction plan list determined in the foregoing manner as the communication restriction information, and stores the same in the storage unit 340. Further, the restriction plan list determining unit 3532 instructs the communication control unit 330 to start the communication control. Further, the restriction plan list determining unit 3532 transmits the communication restriction information to the mobile stations 400 camping on the self station via the communication control unit 330 and the wireless IF unit 320.

Next, a description will be given of the configuration of the mobile station 400. The mobile station 400 includes a wireless IF unit 410, a control unit 420, a storage unit 430, an input unit 440, and a display unit 450.

The wireless IF unit 410 is a wireless communication interface for conducting wireless communication with the radio base station 300. The wireless IF unit 410 receives the communication restriction information transmitted from the radio base station 300, and sends the communication restriction information to the control unit 420.

The control unit 420 exerts a variety of control for conducting wireless communication with the radio base station 300. For example, the control unit 420 exerts control such that a predetermined location registering process is performed and the location information of the self station is stored in the location information accumulating unit 230 in the switching center 200.

Further, when the control unit 420 receives the communication restriction information transmitted from the radio base station 300 via the wireless IF unit 410, the control unit 420 stores the communication restriction information in the storage unit 430, and exerts a variety of control in accordance with the contents shown by the communication restriction information. Specifically, the control unit 420 exerts control for causing the display unit 450 to display the communication restriction contents. Further, when the control unit 420 receives a transmission instruction from the user via the input unit 440, the control unit 420 queries the time point managing unit, which is not shown, to acquire the current time point. Then, the control unit 420 refers to the communication restriction information stored in the storage unit 430, to determine whether or not the current time period is the transmittable period of the self station. As a result of the determination, when the current time period is the period during which the self station is not permitted to perform transmission, the control unit 420 exerts control to reject the transmission instruction, and does not perform a transmission process.

The storage unit 430 stores the communication restriction information transmitted from the control unit 420. The communication restriction information stored in the storage unit 430 is referred to by the control unit 420 as necessary. When the communication restriction is removed, the stored communication restriction information is deleted as necessary under control of the control unit 420.

The input unit 440 is configured by a touch keypad or a touch panel, and accepts inputs such as a transmission request from the user of the terminal for starting a talk.

Following control of the control unit 420, the display unit 450 displays the contents of the communication restriction, to thereby notify the user that a communication restriction is imposed. The display unit 450 may be configured to display, for example, the contents shown in FIG. 7 on the screen, to thereby notify the user about what communication restriction is imposed and whether or not the self station can currently carry out transmission.

Figure 8:
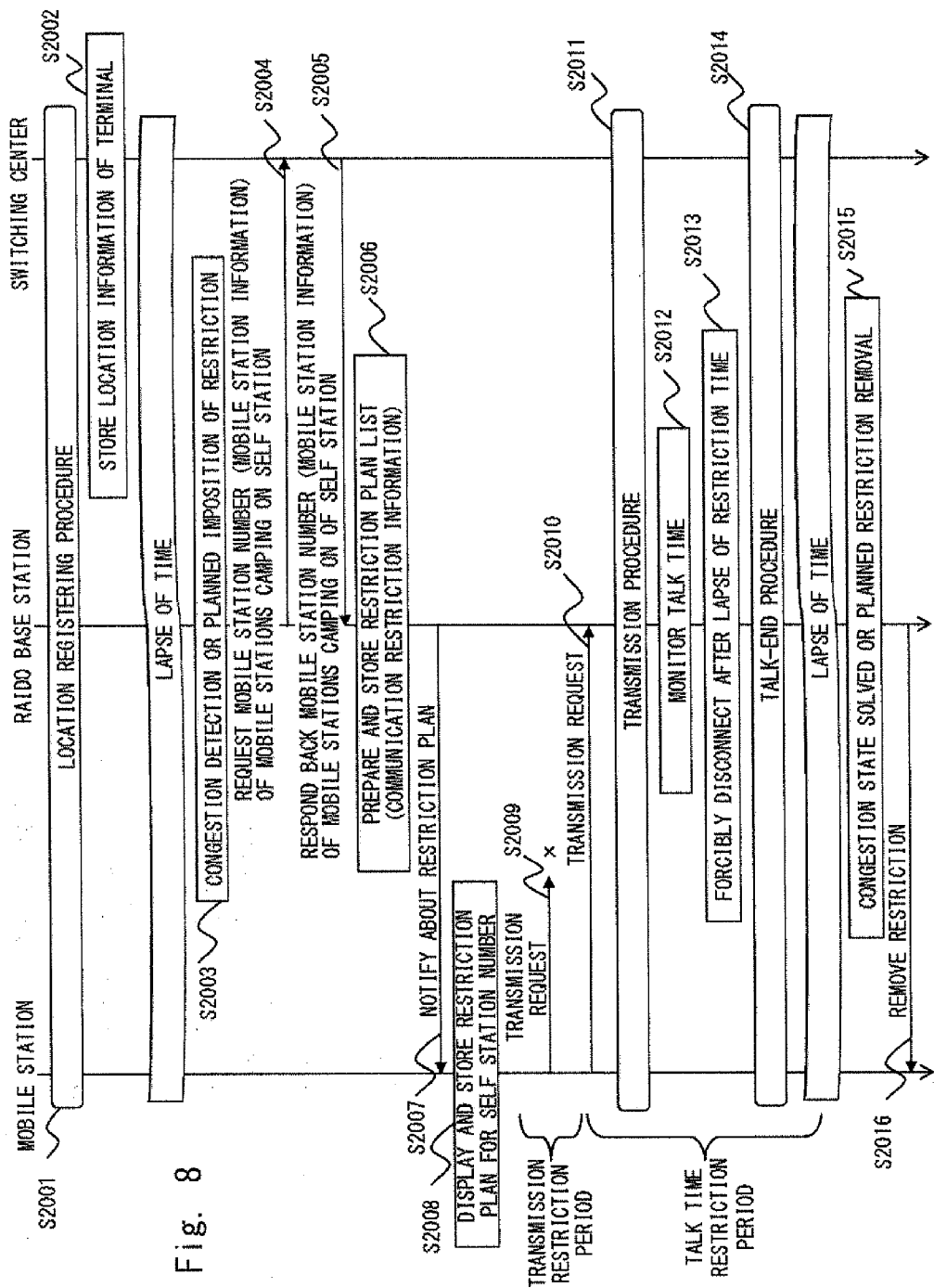
FIG. 8 is a flowchart showing operations of a congestion control system according to the second exemplary embodiment.

Next, a description will be given of an operation of the mobile communication system according to this exemplary embodiment. FIG. 8 is a sequence diagram showing the flow of the operation of the mobile communication system according to this exemplary embodiment.

Firstly, a location registering process is performed between the mobile station 400 and the switching center 200 via the radio base station 300 (S2001). Note that, since the location registering process is a known technique, a description thereof is omitted. By the location registering process, the location information of the mobile station 400 is stored in the location information accumulating unit 230 of the switching center 200 (S2002).

Thereafter, when congestion is triggered by any disaster or event, the congestion detecting unit 3510 monitoring the traffic of the radio base station 300 detects the occurrence of congestion in the self station (S2003). When the congestion detecting unit 3510 detects the occurrence of congestion, the mobile station information collecting unit 3520 requests the switching center 200 to transmit mobile station information of the mobile stations camping on the self station (S2004). Note that, in the example shown in FIG. 8, the mobile station information collecting unit 3520 requests the mobile station number as the mobile station information.

The control unit 210 of the switching center 200 having received the request from the mobile station information collecting unit 3520 of the radio base station 300 responds back, regarding the mobile station number of each of the mobile stations camping on the radio base station 300 as the mobile station information (S2005). Specifically, the control unit 210 acquires the mobile station number of each of the mobile stations camping on the radio base station 300 based on the location information stored in the location information accumulating unit 230 in S2001. Then, the control unit 210 transmits the acquired mobile station numbers to the radio base station 300 via the IF unit 220.

When the mobile station numbers of the mobile stations camping on the radio base station 300 is received from the switching center 200, the communication restriction information generating unit 3530 of the radio base station 300 generates communication restriction information and stores it in the storage unit 340 (S2006). Further, the communication restriction information generating unit 3530 transmits the generated communication restriction information to the mobile stations camping on the self station via the wireless IF unit 320, to thereby notify the mobile stations about the restriction plan (S2007).

The control unit 420 of each mobile station 400 having received the communication restriction information stores the communication restriction information in the storage unit 430 and displays the restriction plan for the self station number on the display unit 450, to thereby let the user know the restriction plan (S2008).

Next, it is assumed that a transmission request is issued by the user via the input unit 440. When the control unit 420 receives the transmission request, the control unit 420 refers to the communication restriction information stored in the storage unit 430, and checks whether or not a transmission restriction is imposed on the self station. In this case, since it corresponds to the transmission restriction period, the control unit 420 rejects the transmission request (S2009).

On the other hand, it is assumed that, as a result of the check, though the current time period corresponds to the transmittable period, the current time period corresponds to the talk time restriction period. In this case, the control unit 420 accepts the transmission request from the user (S2010). Thereafter, a connection is established among the mobile station 400, the radio base station 300, and the switching center 200, and a talk is started (S2011).

When the connection between the mobile station 400 and the switching center 200 is established in the transmission procedure in S2011, the communication control unit 330 of the radio base station 300 starts measuring the talk time and monitors the talk time (S2012). When the measured talk time exceeds the talk time permitted for the mobile station 400 shown by the communication restriction information stored in the storage unit 340, the communication control unit 330 forcibly disconnects the talk (S2013). Thereafter, among the mobile station 400, the radio base station 300, and the switching center 200, a talk-end procedure is normally performed (S2014).

Thereafter, when the congestion detecting unit 3510 of the radio base station 300 detects that the congestion state is solved, the congestion detecting unit 3510 instructs the communication control unit 330 to remove the communication restriction (S2015). The communication control unit 330 notifies the mobile station 400 about the removal of the communication restriction (S2016).

As described above, with the mobile communication system according to the second exemplary embodiment, when an occurrence of congestion is detected by the congestion control unit installed in the radio base station, the communication restriction information is generated while avoiding any imbalance among the mobile stations camping on the self station, and such mobile stations are notified about the communication restriction information. Accordingly, congestion can be avoided in an equal and proper manner.

Further, the mobile station according to this exemplary embodiment is configured to cause the display unit to display the received communication restriction information, to thereby notify the user about the specific contents of the transmission restriction. Accordingly, in the case where congestion occurs at the site where participants in an event gather or upon an occurrence of a natural disaster, since the users of the mobile stations can tell when the restriction is removed, it is possible to avoid the situation where the users unduly perform transmission operations or the situation where they just have to wait for removal of restriction. Accordingly, communications during emergency situations can be improved.

Note that, the above-described operations, i.e., the detection of congestion (S2002) and the resolution of the congestion state (S2015), can be executed as being triggered by the planned restriction start and the planned restriction removal which are performed by a network operator.

Further, in the foregoing, the description has been given of the case where the control unit 420 of the mobile station 400 determines as to whether or not to permit transmission based on the transmittable period set by the communication restriction information. However, the communication control unit of the radio base station 300 may determine as to whether or not to permit a connection based on the transmittable period set by the communication restriction information.

(Third Exemplary Embodiment)

A mobile communication system according to a third exemplary embodiment is characterized in that the switching center includes a congestion control unit for avoiding congestion. In the following, a description will be given with reference to the drawings. However, as to the configurations already described with reference to FIGS. 3 and 4, the description is partially omitted.

Figure 9:
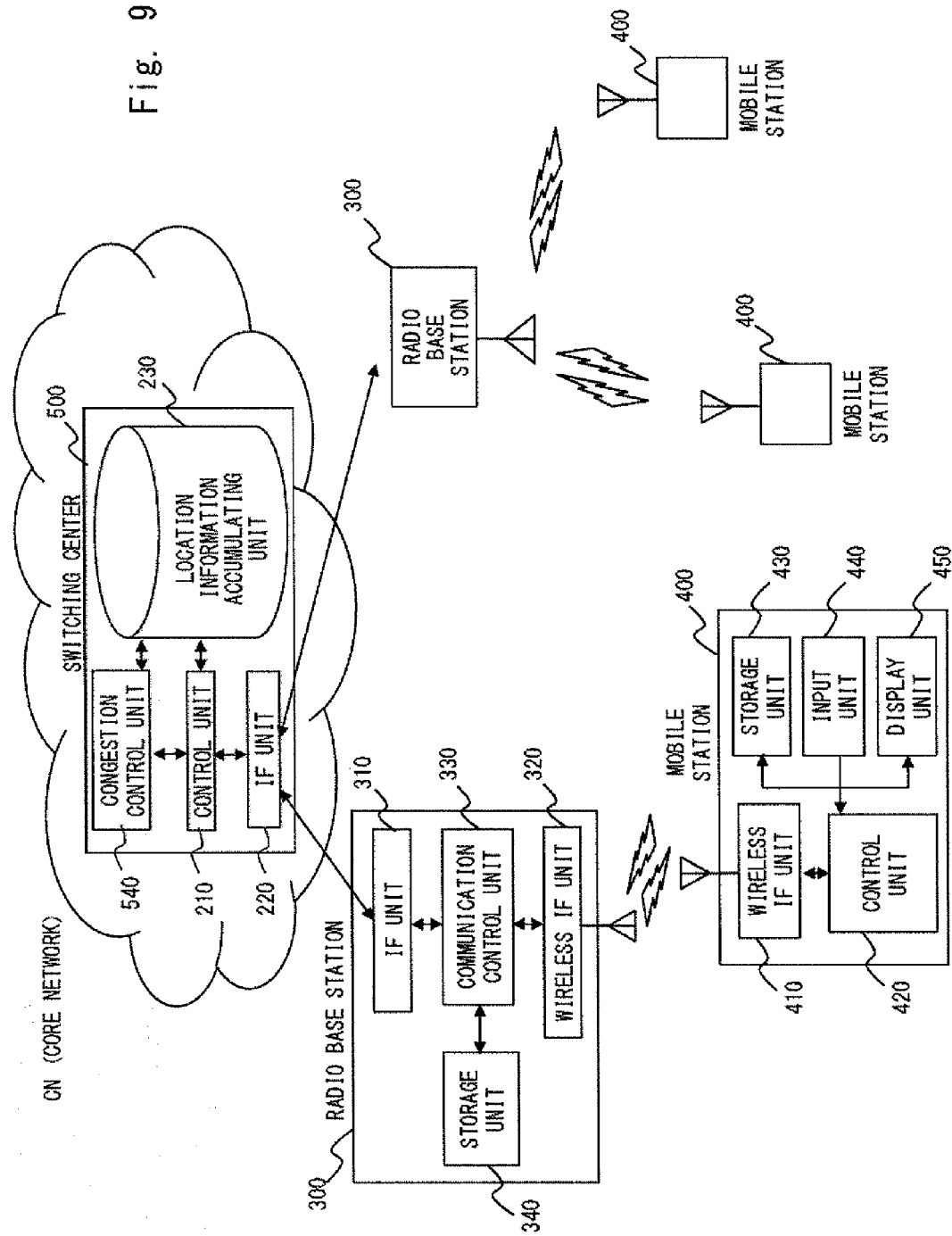
FIG. 9 is a block diagram showing a configuration of the entire mobile communication system according to a third exemplary embodiment.

FIG. 9 shows the entire mobile communication system according to the third exemplary embodiment. The mobile communication system according to the third exemplary embodiment is characterized in that a switching center 500 includes a congestion control unit 540.

Figure 10:
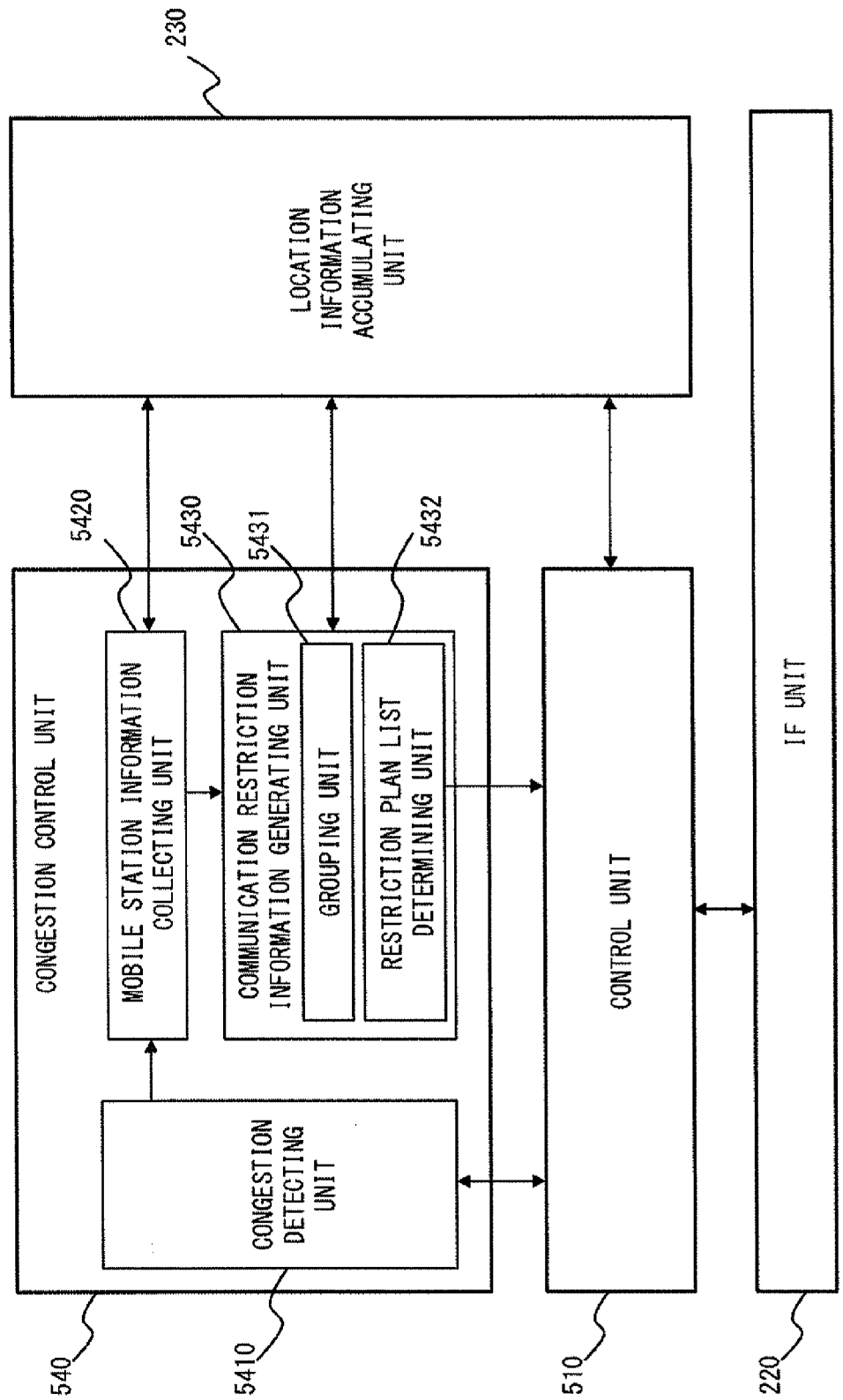
FIG. 10 is a block diagram showing a configuration of a switching center according to the third exemplary embodiment.

FIG. 10 is a block diagram showing the specific configuration of the switching center 500. The switching center 500 includes a control unit 510, an IF unit 220, a location information accumulating unit 230, and a congestion control unit 540.

The control unit 510 communicates with any radio base station via the IF unit 220. Further, the control unit 510 carries out communication under control of the congestion control unit 540 when congestion occurs.

The congestion control unit 540 exerts control for avoiding and solving the congestion state. The congestion control unit 540 specifically includes a congestion detecting unit 5410, a mobile station information collecting unit 5420, and a communication restriction information generating unit 5430.

The congestion detecting unit 5410 monitors data traffic flowing through the control unit 510, and detects whether or not congestion is occurring in the self station. When an occurrence of congestion is detected, the congestion detecting unit 5410 notifies the mobile station information collecting unit 5420 about the occurrence.

When the mobile station information collecting unit 5420 is notified about the occurrence of congestion by the congestion detecting unit 5410, the mobile station information collecting unit 5420 accesses the location information accumulating unit 230, and collects mobile station information on the mobile stations camping on the radio base station to be subjected to a communication restriction. The mobile station information collecting unit 5420 sends the collected mobile station information to the communication restriction information generating unit 5430.

The communication restriction information generating unit 5430 generates communication restriction information taking into consideration of an imbalance as to the mobile station number or the like, based on the mobile station information. Specifically, the communication restriction information generating unit 5430 includes a grouping unit 5431 and a restriction plan list determining unit 5432.

When the grouping unit 5431 receives the mobile station information from the mobile station information collecting unit 5420, the grouping unit 5431 divides the plurality of mobile stations into a plurality of groups using a grouping method according to which an imbalance among the groups becomes equal to or less than a predetermined reference based on the mobile station information.

The restriction plan list determining unit 5432 receives, from the grouping unit 5431, information specifying the grouping method used for the grouping. Then the restriction plan list determining unit 5432 determines the contents of the restriction plan list and generates communication restriction information. The restriction plan list determining unit 5432 outputs the generated communication restriction information to the location information accumulating unit 230 to be stored therein, and also transmits the generated communication restriction information to the radio base station 300 to be subjected to a communication restriction via the control unit 510 and the IF unit 220. The radio base station stores the received communication restriction information in the storage unit 340, and also transmits the received communication restriction information to the mobile stations 400 via the wireless IF unit 320.

Figure 11:
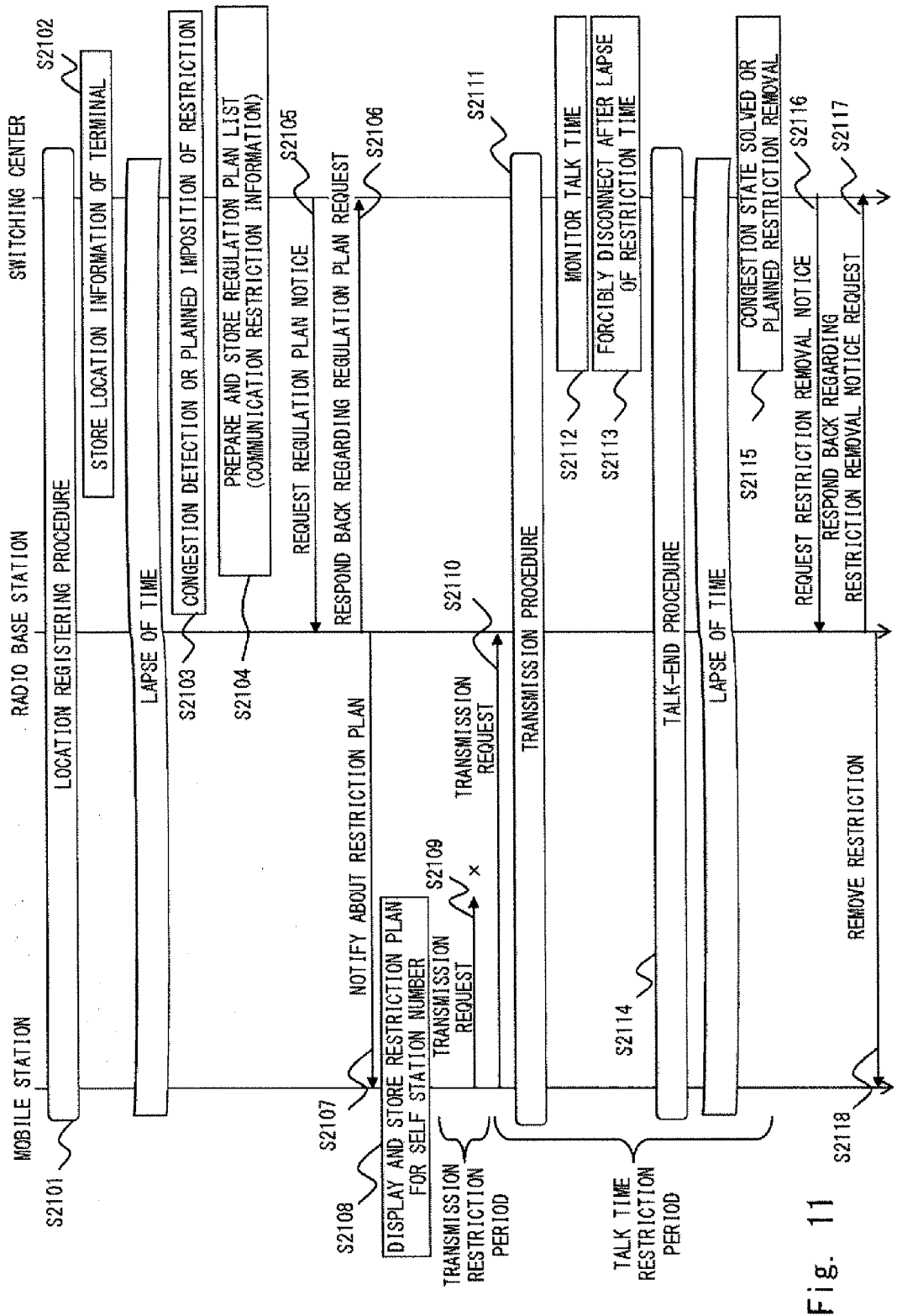
FIG. 11 is a flowchart showing operations of a congestion control system according to the third exemplary embodiment.

Next, a description will be given of the operation of the mobile communication system according to the third exemplary embodiment. FIG. 11 is a sequence diagram showing the operation of the mobile communication system according to the third exemplary embodiment.

In FIG. 11, since S2101, S2102, S2107 to S2111, and S2114 are respectively identical to S2001, S2002, S2007 to S2011, and S2014 of the sequence diagram shown in FIG. 8, the description thereof is omitted.

Upon an occurrence of a disaster or the like, the congestion control unit 540 in the switching center 500 detects an occurrence of congestion in the self station (S2103). When the congestion control unit 540 detects the occurrence of congestion, the communication restriction information generating unit 5430 generates communication restriction information taking into consideration of an imbalance among the groups, and accumulates the communication restriction information in the location information accumulating unit 230 (S2104).

Further, the congestion control unit 540 transmits the generated communication restriction information to the radio base stations via the control unit 510 and the IF unit 220, and requests the radio base stations to notify the mobile stations about the restriction plan (S2105). The communication control unit 330 of each radio base station stores the communication control information in the storage unit 340, and responds back to the switching center 200 regarding the restriction plan notice request (S2106).

When the connection between a mobile station 400 and the switching center 200 is established in the transmission procedure in S2111, the control unit 510 of the switching center 500 starts measuring the talk time and monitors the talk time (S2012). Further, when the measured talk time exceeds the talk time permitted for the mobile station 400 set by the communication restriction information stored in the location information accumulating unit 230, the control unit 510 forcibly disconnects the talk (S2113).

Thereafter, when the congestion detecting unit 5410 of the switching center 500 detects that the congestion state is solved, the congestion detecting unit 5410 instructs the control unit 510 to remove the communication restriction (S2115). The control unit 510 notifies the radio base stations 300 about a restriction plan cancel request (S2116). Each radio base station 300 having received the notice responds back to the switching center, and deletes or invalidates the corresponding communication control information stored in the storage unit 340 (S2117). Further, each radio base station 300 notifies the mobile stations 400 camping on the base station about the restriction removal (2118).

In this manner, with the mobile communication system according to the third exemplary embodiment, the congestion control unit is installed in the switching center governing a plurality of radio base stations, and congestion occurring in the switching center is detected and congestion control is exerted. Accordingly, a planned restriction can be imposed on the service area of a wider range.

Figure 12:
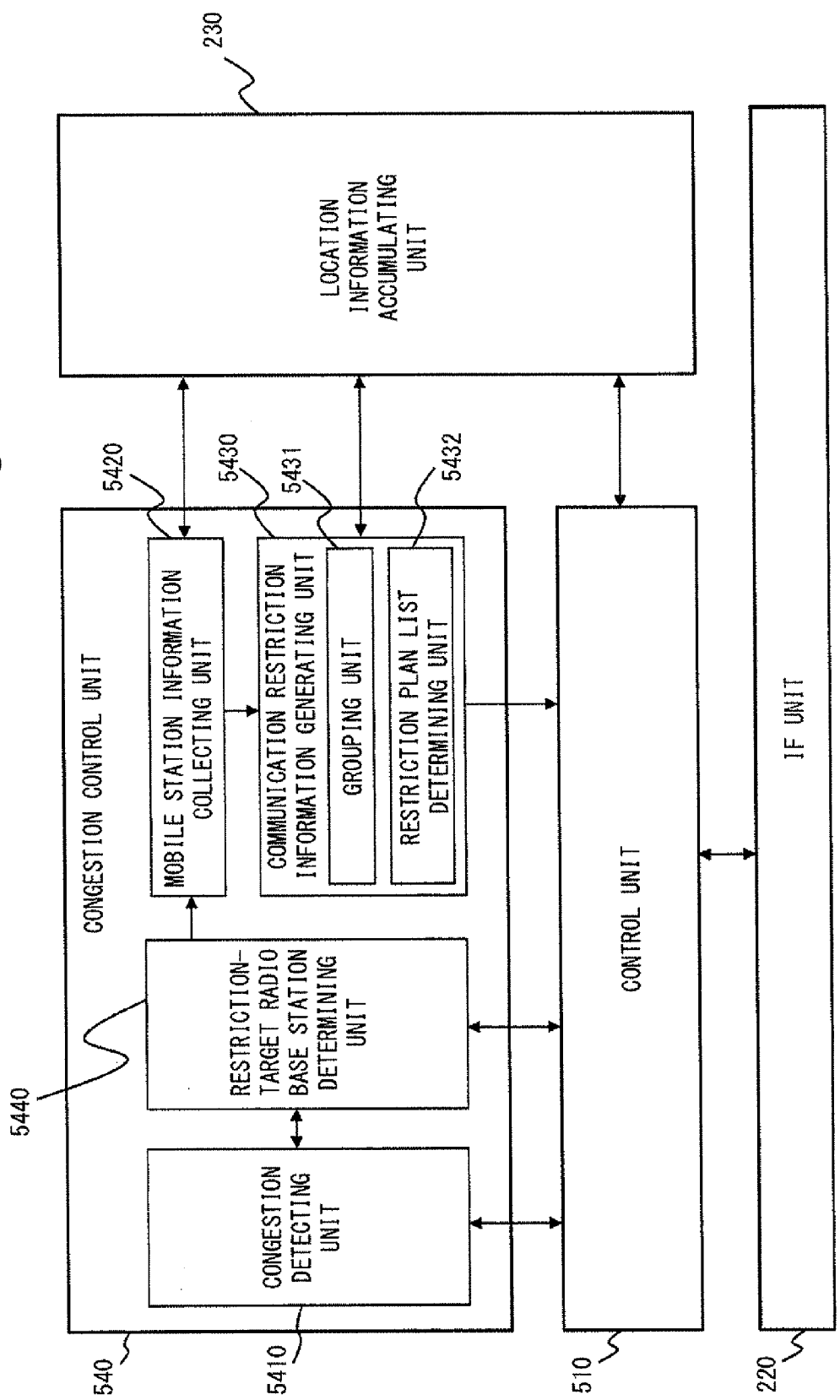
FIG. 12 is a block diagram showing another configuration of the switching center according to the third exemplary embodiment.

Note that, in the foregoing, though the description has been given of the configuration in which the congestion detecting unit 5410 monitors the traffic of the control unit 510 to thereby detect an occurrence of congestion in the self station 500, the present invention is not limited thereto. The congestion detecting unit 5410 may monitor the data flowing through the control unit 510 to thereby detect an occurrence of congestion in the radio base stations governed by the self station. In this case, as shown in FIG. 12, the congestion control unit 540 further includes a restriction-target radio base station determining unit 5440.

When the restriction-target radio base station determining unit 5440 detects an occurrence of the congestion detecting unit 5410, it specifies in which radio base station the congestion is occurring, and determines the radio base station to be the target of the communication restriction. The restriction-target radio base station determining unit 5440 notifies the mobile station information collecting unit 5420 about information identifying the radio base station to be the target of the communication restriction, such as the base station ID. The mobile station information collecting unit 5420 collects the mobile station information on the mobile stations to be the target of the restriction from the location information accumulating unit 230. Such a configuration may also be employed.

Further, in the present invention, the functions of the congestion control unit realizing congestion control may be separately allocated to the radio base station and the switching center to structure the congestion control system. For example, in the foregoing, though it has been described as to the case where the congestion detecting unit is provided in the switching center, the present invention is not limited thereto. The congestion detecting unit may be disposed in each of the radio base stations, such that an occurrence of congestion is detected by the traffic of the radio base stations being monitored.

In this case, when the congestion detecting unit disposed in the radio base station 300 detects an occurrence of congestion, the congestion detecting unit notifies the congestion control unit 540 disposed in the switching center 500. When the mobile station information collecting unit 5420 of the congestion control unit 540 receives the notice about the occurrence of congestion from the radio base station 300, the mobile station information collecting unit 5420 collects the mobile station information on the mobile stations camping on the radio base station 300. Then, communication restriction information is generated at the communication restriction information generating unit 5430. The generated communication restriction information is transmitted to the radio base station 300 and stored in the storage unit 340 in the radio base station, and thereafter the communication control unit 330 may exert communication control based on the communication restriction information.

Further, the congestion control unit realizing the congestion control may be installed in other apparatus that governs switching centers.

As has been described in connection with the exemplary embodiments in the foregoing, the present invention can provide a congestion control method for a mobile communication system which equally enables the users to conduct communication in emergency situations while avoiding congestion, when congestion is detected or expected.

Further, since the restriction contents are displayed at each mobile station at the display unit, the users are prevented from becoming uncertain when the restriction is removed. Accordingly, it becomes possible to prevent the situation where the users unduly perform transmission operations or the situation where they just have to wait for removal of a restriction while being unable to conduct communication during emergency situations.

Further, since the congestion control unit (the congestion control apparatus) can monitor the talk time and forcibly disconnect as necessary, it becomes possible to prevent any user, who is temporarily released from restriction and starts a talk, from occupying the line for a long period, and to allow other users to equally use the line.

Figure 13:
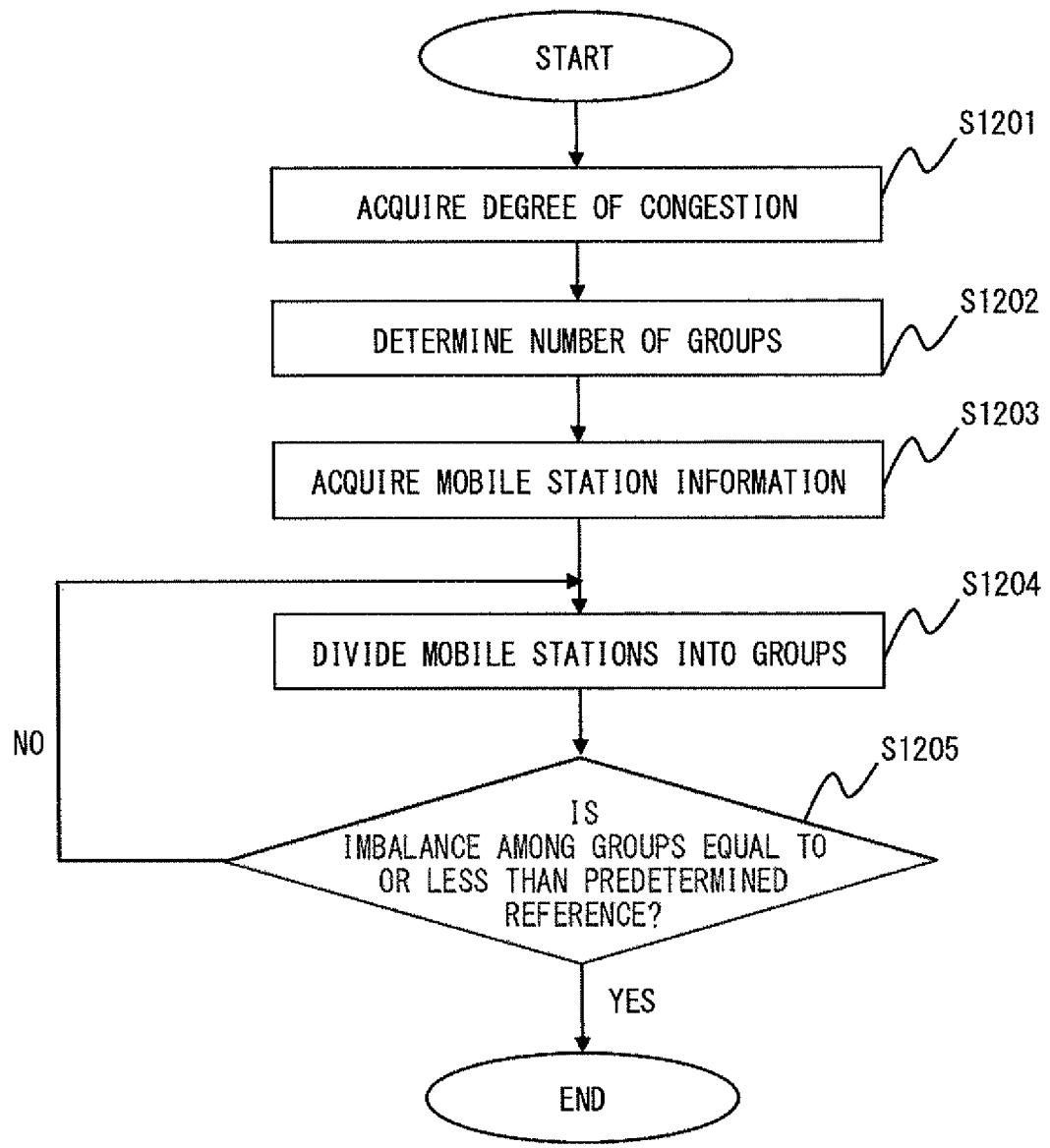
FIG. 13 is a flowchart showing further another example of processing operations in the grouping unit according to the present invention.

Note that, in the foregoing, though the description has been given of the case where the grouping unit performs grouping to create a predetermined number of groups, the present invention is not limited thereto. FIG. 13 is a flowchart showing one example of the grouping method performed by the grouping unit.

The grouping unit acquires information on the degree of congestion, i.e., the degree of seriousness of congestion, from the congestion detecting unit (S1201). Next, the grouping unit acquires mobile station information from the mobile station information collecting unit (S1202).

The grouping unit determines into what number of groups the grouping should be performed for imposing a restriction, based on the information on the degree of congestion acquired in Step 1201 or the number of mobile stations specified by the mobile station information acquired in Step 1202 (S1203). That is, the grouping unit determines the number of groups.

Next, the grouping unit performs grouping in which the mobile stations are divided into the groups as many as the number determined in Step 1203 according to a predetermined grouping method (S1204). Here, whether or not an imbalance among the groups is equal to or less than a predetermined reference, that is, whether or not a predetermined reference is satisfied is determined (S1205). As a result of determination, when the imbalance exceeds the predetermined reference, the control returns to S1204, and grouping is again performed according to a different grouping method (S1205).

By performing grouping according to such a procedure, communication control can be more properly exerted. Further, the restriction plan list determining unit at the following stage may also acquire the degree of congestion from the congestion detecting unit and acquire the number of mobile stations to be subjected to the communication restriction from the mobile station information collecting unit. Then, the communication restriction information should be generated based on these pieces of information. For example, when the degree of congestion is serious or the number of mobile stations to be the target of a restriction is great, it is also possible to generate the communication restriction information having the permitted talk time set to be shorter than the predetermined reference.

Further, in the foregoing description, though the description has been given of the case where the communication restriction information is generated as being triggered by detection of an occurrence of congestion, the present invention is not limited thereto. It is also possible to periodically generate the communication restriction information before congestion occurs. For example, the congestion control unit may have a timer for measuring a certain time, and the restriction-target mobile station collecting unit may collect mobile station information every certain time measured by the timer, whereas the communication restriction information generating unit may generate communication restriction information and store the same in the storage unit. In this case, when the congestion occurrence detecting unit detects an occurrence of convergence, the congestion occurrence detecting unit notifies the communication control unit about the occurrence of congestion, and the communication control unit reads the communication restriction information stored in the storage unit and transmits the same to the camping mobile stations.

That is, communication restriction information is preliminarily and periodically generated at the stage before congestion occurs, in preparation for an occurrence of congestion. Thus, the state where a restriction can be imposed just by transmitting the already generated communication restriction information upon an occurrence of congestion is maintained.

In this case, since it is unnecessary to create the restriction plan list upon an occurrence of congestion, the users can be notified about the restriction plan more quickly. Further, upon an occurrence of a disaster, a communication restriction must be imposed on a greater range, and therefore the congestion control process may be intensively required. Such a situation can be alleviated. That is, since the communication restriction information is preliminarily created, what is required is just to send the notice of such information. Hence, a communication restriction can be imposed quickly and precisely, and an occurrence of convergence can be avoided.

Further, in the foregoing, though the description has been given of the case where the congestion detecting unit detects an occurrence of congestion, the present invention is not limited thereto. The congestion detecting unit may monitor the traffic quantity, and congestion control may be started when an occurrence of congestion is expected. That is, the congestion detecting unit may be configured to instruct, when the traffic quantity flowing through the communication control unit exceeds a predetermined first reference, the mobile station information collecting unit to collect mobile station information. Such a configuration makes it possible to impose a proper and equal communication restriction while avoiding an occurrence of congestion. Note that, in this case, the restriction contents may be relatively loose, i.e., communication restriction information puts the upper limit just on the permitted talk time. When the congestion detecting unit detects that the traffic quantity exceeds a second reference, which is the reference of a congestion occurrence, the restriction contents may be altered. Then, the communication restriction information may be generated and transmitted, to carry out a communication restriction.

Further, in the foregoing, though the description has been given of the case where the congestion detecting unit monitors the traffic quantity to thereby detect congestion, the present invention is not limited thereto. For example, the congestion detecting unit may monitor the CPU load factor of the communication control unit, and when the load factor exceeds a predetermined reference value (e.g., 90%) for a certain time period, it may be determined that congestion is occurring.

Still further, in the foregoing, though the description has been given of the case where the communication restriction information is generated or transmitted when congestion is detected or expected by the congestion detecting unit, the present invention is not limited thereto. It is also possible to further include a receiver unit that receives disaster information notifying about an occurrence of a disaster such as an earthquake from an external source, and the communication restriction process described above may be performed based on the received information. Further, such information to be received may be Earthquake Early Warning distributed by the meteorological agency. When an earthquake of a predetermined reference magnitude or greater occurs, by starting the communication restriction process before the main shock occurs, the communication restriction can be performed in a proper manner before the congestion state is reached.

Further, in the foregoing description, though the object is to solve the congestion state upon an occurrence of congestion, the present invention can achieve other purposes. For example, not only when congestion is occurring but when traffic is heavy, a time period during which high throughput is guaranteed can be allocated to each mobile station. In this case, while the communication restriction information generating unit imposes a communication restriction on the mobile stations camping on any radio base station being the target of a communication restriction, it guarantees high throughput to a predetermined group for a predetermined period.

Normally, throughput is limited when traffic is heavy. However, making a reservation to download heavy data in a time period during which high throughput is available, convenience of the users can be improved.

Note that, the present invention is not limited to the exemplary embodiments described above, and can be modified as appropriate in the range not departing from the gist of the present invention. For example, the present invention can be practiced in the following modes.

(1) A congestion control apparatus including: collecting means for collecting mobile station information on a plurality of mobile stations camping on a radio base station to be a target of a communication restriction; grouping means for dividing, based on the mobile station information, the plurality of mobile stations into a plurality of groups each serving as a unit of the communication restriction, by using a grouping method according to which an imbalance among the groups becomes equal to or less than a predetermined reference; and transmission means for transmitting information specifying the grouping method.

(2) The congestion control apparatus according to (1), further including: generation means for generating communication restriction information indicative of communication restriction contents containing the information specifying the grouping method, wherein the transmission means is configured to transmit the communication restriction information.

(3) The congestion control apparatus according to (2), wherein the generation means is configured to generate the communication restriction information by setting, to each of the groups divided by the grouping means, a permitted talk time indicative of a length of a time during which a talk is permitted and a transmittable period indicative of a time period during which transmission is permitted.

(4) The congestion control apparatus according to any one of (1) to (3), wherein the grouping means is configured to divide, based on the mobile station information, the plurality of mobile stations into the plurality of groups, by using a grouping method according to which an imbalance among the groups becomes equal to or less than a predetermined reference as to the number of mobile stations belonging to each of the groups.

(5) The congestion control apparatus according to any one of (1) to (4), wherein the grouping means is configured to determine the number of groups based on the mobile station information, and to divide the plurality of mobile stations into the determined number of groups by using a grouping method according to which an imbalance among the groups becomes equal to or less than a predetermined reference.

(6) The congestion control apparatus according to (3), further including: communication control means for controlling communication of the mobile stations; and measuring means for measuring a talk time of each of the mobile stations, wherein the communication control means is configured to exerts control for disconnecting a talk of a mobile station, when a talk time of the mobile station measured by the measuring means exceeds the permitted talk time of the mobile station set by the communication restriction information.

(7) The congestion control apparatus according to (6), wherein the communication control means is configured to exert control for rejecting a communication connection request, when a time point at which the communication connection request is received from a mobile station is outside a transmittable period of the mobile station set by the communication restriction information.

(8) The congestion control apparatus according to (1) to (7), further including: detecting means for detecting an occurrence of congestion; and determining means for determining the radio base station to be the target of the communication restriction, when the occurrence of congestion is detected by the detecting means, wherein the collecting means is configured to collect, when the occurrence of congestion is detected by the detecting means, mobile station information on a plurality of mobile stations camping on the radio base station determined to be the target of the communication restriction, from a storage apparatus storing mobile station information on a plurality of mobile stations respectively camping on a plurality of radio base stations.

(9) The congestion control apparatus according to (8), wherein the determining means is configured to determine, by determining a switching center to be the target of the communication restriction based on the detected congestion, radio base stations governed by the switching center as the radio base station to be the target of a communication restriction.

(10) A congestion control method including: collecting mobile station information on a plurality of mobile stations camping a radio base station to be a target of a communication restriction; dividing, based on the mobile station information, the plurality of mobile stations into a plurality of groups, by using a grouping method according to which an imbalance among the groups becomes equal to or less than a predetermined reference; and transmitting information specifying the grouping method.

(11) A radio base station apparatus including configurations according to (1) to (10).

(12) A switching center apparatus including configurations according to (1) to (10).

(13) The congestion control apparatus according to (2) to (9), further including: storage means for temporarily storing the generated communication restriction information, wherein the generation means is configured to generate the communication restriction information every predetermined period, and to temporarily store the generated communication restriction information in the storage means, and wherein the transmission means is configured to transmit the communication restriction information temporarily stored in the storage means upon an occurrence of congestion or when an occurrence of congestion is expected.

(14) The congestion control apparatus according to (13), wherein the collecting means is configured to collect mobile station information on a plurality of mobile stations camping on the radio base station to be the target of a communication restriction every predetermined period, and the generation means is configured to generate communication restriction information indicative of communication restriction contents containing information specifying the grouping method every aforementioned predetermined period and to temporarily store the generated communication restriction information in the storage means.

(15) The congestion control apparatus according to (13) or (14), further including: congestion detecting means for detecting an occurrence of congestion or expecting an occurrence of congestion, wherein the transmission means is configured to read and transmit the communication restriction information temporarily stored in the storage means when the congestion detecting means detects an occurrence of congestion or expects an occurrence of congestion.

The present application claims priority rights of and is based on Japanese Patent Application No. 2011-172895 filed on Aug. 8, 2011 in the Japanese Patent Office, the entire contents of which are hereby incorporated by reference.

INDUSTRIAL APPLICABILITY

The present invention is applied to a congestion control apparatus, a congestion control method, and a congestion control system. In particular, the present invention is applied to the purpose of exerting congestion control among mobile stations subjected to a communication restriction while maintaining equality.

REFERENCE SIGNS LIST

100 CONGESTION CONTROL APPARATUS
110 MOBILE STATION INFORMATION COLLECTING UNIT
120 GROUPING UNIT
130 TRANSMISSION UNIT
200 SWITCHING CENTER
210 CONTROL UNIT
220 IF UNIT
230 LOCATION INFORMATION ACCUMULATING UNIT
300 RADIO BASE STATION
310 IF UNIT
320 WIRELESS IF UNIT
330 COMMUNICATION CONTROL UNIT
340 STORAGE UNIT
350 CONGESTION CONTROL UNIT
400 MOBILE STATION
410 IF UNIT
420 CONTROL UNIT
430 STORAGE UNIT
440 INPUT UNIT

450 DISPLAY UNIT
500 SWITCHING CENTER
510 CONTROL UNIT
540 CONGESTION CONTROL UNIT
3310 TALK TIME MEASURING UNIT
3510 CONGESTION DETECTING UNIT
3520 MOBILE STATION INFORMATION COLLECTING UNIT
3530 COMMUNICATION RESTRICTION INFORMATION GENERATING UNIT
3531 GROUPING UNIT
3532 RESTRICTION PLAN LIST DETERMINING UNIT
5410 CONGESTION DETECTING UNIT
5420 MOBILE STATION INFORMATION COLLECTING UNIT
5430 COMMUNICATION RESTRICTION INFORMATION GENERATING UNIT
5431 GROUPING UNIT
5432 RESTRICTION PLAN LIST DETERMINING UNIT
5440 RESTRICTION-TARGET RADIO BASE STATION DETERMINING UNIT

The invention claimed is:

1. A congestion control apparatus comprising:
a collecting unit that collects mobile station information on a plurality of mobile stations camping on a radio base station to be a target of a communication restriction;
a grouping unit that divides, based on the mobile station information, the plurality of mobile stations into a plurality of groups each serving as a unit of the communication restriction, by using a grouping method according to which an imbalance among the groups becomes equal to or less than a predetermined reference;
a transmission unit that transmits information specifying the grouping method;
a generation unit that generates communication restriction information indicative of communication restriction contents containing the information specifying the grouping method; and
a storage unit that temporarily stores the generated communication restriction information,
wherein the transmission unit is configured to transmit the communication restriction information,
wherein the generation unit is configured to generate the communication restriction information every predetermined period before congestion occurs, and to temporarily store the generated communication restriction information in the storage unit, and
wherein the transmission unit is configured to transmit the communication restriction information temporarily stored in the storage unit upon an occurrence of congestion or when an occurrence of congestion is expected.

2. The congestion control apparatus according to claim 1, wherein the generation unit is configured to generate the communication restriction information by setting, to each of the groups divided by the grouping unit, a permitted talk time indicative of a length of a time during which a talk is permitted and a transmittable period indicative of a time period during which transmission is permitted.

3. The congestion control apparatus according to claim 1, wherein the grouping unit is configured to divide, based on the mobile station information, the plurality of mobile stations into the plurality of groups, by using a grouping method according to which an imbalance among the groups becomes equal to or less than a predetermined reference as to the number of mobile stations belonging to each of the groups.

4. The congestion control apparatus according to claim 1, wherein the grouping unit is configured to determine the number of groups based on the mobile station information, and to divide the plurality of mobile stations into the determined number of groups by using a grouping method according to which an imbalance among the groups becomes equal to or less than a predetermined reference.

5. The congestion control apparatus according to claim 2, further comprising:
a communication control unit that controls communication of the mobile stations; and
a measuring unit that measures a talk time of each of the mobile stations,
wherein the communication control unit is configured to exerts control for disconnecting a talk of a mobile station, when a talk time of the mobile station measured by the measuring unit exceeds the permitted talk time of the mobile station set by the communication restriction information.

6. The congestion control apparatus according to claim 5, wherein the communication control unit is configured to exert control for rejecting a communication connection request, when a time point at which the communication connection request is received from a mobile station is outside a transmittable period of the mobile station set by the communication restriction information.

7. The congestion control apparatus according to claim 1, further comprising:
a detecting unit that detects an occurrence of congestion; and
a determining unit that determines the radio base station to be the target of the communication restriction, when the occurrence of congestion is detected by the detecting unit,
wherein the collecting unit is configured to collect, when the occurrence of congestion is detected by the detecting unit, mobile station information on a plurality of mobile stations camping on the radio base station determined to be the target of the communication restriction, from a storage apparatus storing mobile station information on a plurality of mobile stations respectively camping on a plurality of radio base stations.

8. A congestion control method comprising:
collecting mobile station information on a plurality of mobile stations camping a radio base station to be a target of a communication restriction;
dividing, based on the mobile station information, the plurality of mobile stations into a plurality of groups, by using a grouping method according to which an imbalance among the groups becomes equal to or less than a predetermined reference;
transmitting information specifying the grouping method;
generating communication restriction information indicative of communication restriction contents containing the information specifying the grouping method;
temporarily storing the generated communication restriction information; and
transmitting the communication restriction information,
wherein the communication restriction information is generated every predetermined period before congestion occurs, and the generated communication restriction information is temporarily stored, and wherein the temporarily stored communication restriction information is transmitted upon an occurrence of congestion or when an occurrence of congestion is expected.

9. The congestion control apparatus according to claim 2, wherein the grouping unit is configured to divide, based on the mobile station information, the plurality of mobile stations into the plurality of groups, by using a grouping method according to which an imbalance among the groups becomes equal to or less than a predetermined reference as to the number of mobile stations belonging to each of the groups.

10. The congestion control apparatus according to claim 2, wherein the grouping unit is configured to determine the number of groups based on the mobile station information, and to divide the plurality of mobile stations into the determined number of groups by using a grouping method according to which an imbalance among the groups becomes equal to or less than a predetermined reference.

11. The congestion control apparatus according to claim 3, wherein the grouping unit is configured to determine the number of groups based on the mobile station information, and to divide the plurality of mobile stations into the determined number of groups by using a grouping method according to which an imbalance among the groups becomes equal to or less than a predetermined reference.

12. The congestion control apparatus according to claim 1, wherein the communication restriction information is preliminarily generated and stored at a stage before congestion occurs, in preparation for an occurrence of congestion, and a state where a restriction can be imposed by transmitting an already generated communication restriction information upon an occurrence of congestion is maintained.

13. The congestion control apparatus according to claim 1, further comprising:
a timer for measuring a certain time,
wherein the collecting unit is configured to collect mobile station information every certain time measured by the timer, and
wherein the generation unit is configured to periodically generate the communication restriction information before congestion occurs, and to temporarily store the generated communication restriction information in the storage unit.

14. The congestion control apparatus according to claim 1, wherein the generation unit is configured to preliminarily and periodically for every predetermined period generate a communication restriction information before congestion occurs, and to temporarily store the generated communication restriction information in the storage unit.

15. The congestion control apparatus according to claim 1, wherein the generation unit is configured to preliminarily and periodically for every predetermined period according to a timer, generate a communication restriction information before congestion occurs.

* * * * *